United States Patent Office 2,813,839
Patented Nov. 19, 1957

2,813,839

METHOD OF PRODUCING FOAMS FROM SELF-FROTHING SILICON RESINS

John B. Rust, Verona, N. J., and Leonard Spialter, Allston, Mass., assignors, by direct and mesne assignments, of one-half to Montclair Research Corporation, a corporation of New Jersey, and one-half to Ellis-Foster Company, a corporation of New Jersey No Drawing. Application June 13, 1951,
Serial No. 231,446

6 Claims. (Cl. 260—2.5)

This invention relates to silicon-resin foams, that is, to resin-forming organo-silicon compounds which have been converted into foams such as foamed silicones, to methods of making such products and to their utilization. This application is a continuation-in-part of application Serial No. 732,134, filed March 3, 1947, entitled Silicon-Resin Foams.

Among the objects of the present invention is the preparation of silicon-resin foams such as foamed silicones and related products.

Further objects include methods of producing such foams.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention resin-forming organo-silicon derivatives either as compounds per se, or mixtures or compositions containing them, are converted into solid foams. Any resin-forming organo-silicon derivative which is capable of passing through a liquid stage in which it may be caused to produce a froth and then cured to form a solid foam may be utilized. Curing may be defined as becoming tackfree as for example curing temperature is the temperature at which the silicone film becomes hard and tackfree. The organo-silicon derivatives capable of being utilized in this way are generally those which contain hydrocarbon or substituted hydrocarbon groups attached to the silicon as well as oxygen attached to the silicon and they may be generally referred to as resin-forming organo-silicone compounds or mixtures or compositions containing them. Other terms that may be utilized in describing such derivatives are organo-siloxanes, silicone polymers, or organo-silicon oxides. The character of foam produced depends on the average length and character of the organo groups attached to the silicon and on the ratio of such organo groups to silicon. For example, where alkyl groups are present the resin-forming organo-silicone compound will be one which contains an average of 0.5 to 2 alkyl groups per silicon atom in the silicon portion of the composition and the average length and character of the alkyl groups as well as the alkyl to silicon ratio will determine the characteristics of the ultimate foam obtained. For example, higher alkyl groups and ratios of alkyl group to silicon approaching 2 give resilient rubbery foams which may be utilized for example, for fillers, packing, shock absorbers, and the like. Conversely, the lower alkyl groups and ratios of such groups to silicon approaching the 0.5 yield hard inflexible foams particularly adapted for insulation purposes, supports, etc. Thus it is possible to control the characteristics of the foams obtained by the nature of the groups present and the ratio of such organo groups to silicon and variation in the characteristics and properties of the foams may be made by choice of such substituent groups and the ratios in which they are employed.

Such resin-forming organo-silicon compounds include the halogen hydrolysis products of organo-silicon halides, silicon esters, silicon acylates, alkoxy silicons, substituted alkoxy silicons such as chloroalkoxy silicons obtained for example, by reaction of silicon halides such as chloro silicons with olefine oxides such as ethylene oxide and propylene oxide, the esters and acylates already mentioned such as silicon acetates, etc., and various condensation products and mixtures of such products obtained as the result of the action of water, heat, chemical agents, and the like, on said esters, acylates, alkoxy-silicons, etc. The silicon esters and acylates may be those produced from aliphatic acids including the fatty acids such as acetic acid, propionic and higher fatty acids, etc. or aromatic acids such as benzoic, phthalic, etc. and esters of both monobasic and polybasic aliphatic and aromatic acids may be included. It is not necessary to utilize individual compounds as the resin-forming organo-silicon derivatives, but mixtures of any of the stated derivatives as set forth above may be utilized.

Organo-silicon halides include particularly those halides which contain chlorine and bromine and are capable of being halogen-hydrolyzed to produce resin-forming materials. Such halides will generally contain 2 or 3 halogens attached to the silicon and various mixtures of such organo-silicon halides may be employed including also the organo-silicon monohalides and various combinations of them with the halides mentioned above. Individual organo-silicon halides as set forth above may be hydrolyzed and used to produce resin-forming materials or various mixtures of the various organo-silicon halides may be employed and cohydrolysis products produced from them in the production of resin-forming materials, or mixtures of hydrolyzed organo-silicon halides may be employed.

While the halides particularly referred to have been indicated as chlorides and bromides, the fluorine derivatives may also be employed, particularly the halides containing 3 fluorine atoms attached to silicon which on hydrolysis yield silicone types of products where fluorine is still retained in the molecule attached to silicon. Mixtures of such silicon fluorides with other halides such as the chlorides and bromides may also be employed to produce complex products in which some fluorine is retained in the molecule to modify the characteristics of the ultimate product obtained. In such organo-silicon halides and in the alkoxy silicons that are utilized, the organo groups may include aliphatic radicals both saturated and unsaturated such as the alkyls including methyl, ethyl, propyl, isopropyl, butyl, isobutyl, the various amyls, hexyl, heptyl, octyl, etc., up to the higher alkyl groups such as those containing from 16 to 18 and 20 carbon atoms, etc., as well as the unsaturated aliphatics including the olefinyl derivatives such as vinyl, allyl, etc.; or the organo groups may be carbocyclic including phenyl, tolyl, etc., or alkaryl and aralkyl such as benzyl; or the organo groups may be cycloaliphatic including such groups as cyclohexyl, or they may be naphthenic; or various mixed organo substituents may be present in the silicon derivatives.

These various oxygen containing derivatives particularly emphasized for use herein may be formulated as containing at least two —O(CO)$_x$R groups attached through oxygen to silicon where R is a monovalent hydrocarbon radical that may be substituted by non-functional groups (e. g. groups which do not interfere) such as halogen, and $x$ is from zero to one. The compounds used are capable of frothing in the absence of any added frothing agent while in the liquid state at elevated temperature and are capable in that state of curing by heat, In these formulations R will in general be alkyl, aryl, and cycloalkyl, when $x$ is one, or when X is zero. The remaining groups attached to silicon in compounds containing at least two —O(CO)$_x$R groups as set forth above, may be a wide variety of groups such as hydrogen, halogen such as fluorine, chlorine, bromine, monovalent hydrocarbon groups such as any alkyl, aryl, and cycloalkyl, and substituted (e. g. by halogen) monovalent hydrocarbon groups such as alkyl, aryl, and cycloalkyl where the substituent groups are non-functional as described above.

Exemplary compounds include methyl diacetoxysilane, higher alkyl diacetoxysilanes, dimethyl diacetoxysilane, diethyldiacetoxysilane, and higher dialkyldiacetoxysilanes, methyltriacetoxysilane, ethyltriacetoxysilane, propyltriacetoxysilane, butyltriacetoxy silane, and higher triacetoxysilanes, tetraacetoxysilane, and similar compounds where other acyloxy groups such as propionoxy, butyroxy, benzoxy, etc., replace the acetoxy group in whole or in part.

The alkyloxy and aryloxy, and cyclo alkyloxy derivatives include diethoxysilane and higher dialkoxysilanes; triethoxysilane, tripropoxysilane and higher trialkoxysilanes; mono alkyl dialkoxy silanes such as methyl di-B-chloroethoxysilane; dialkyl dialkoxysilanes such as dimethyldiethoxy silane, diethyl dimethoxysilane, dimethylbutoxyethoxysilane, diethyl diethoxysilane, and higher dialkyldialkoxysilanes; dialkyloxydihalosilanes such as dimethoxydichlorosilanes, ethoxy methoxydichlorosilanes, diethoxydifluorosilane, diethoxydichlorosilane, butoxymethoxydichlorosilane, and higher dialkoxy dihalosilanes; trialkoxysilanes including trimethoxy chlorosilane, triethoxychlorosilane, triethoxyfluoro silane, methyl triethoxysilane, ethyl triethoxysilane, and higher trialkoxysilanes; tetraalkoxysilanes including tetramethoxysilane, tetra-B-chloroethoxysilane, tetraethoxysilane, tetrabutoxysilane, and higher tetraalkoxysilanes; alloxy, methalloxy, crotonoxy and similar compounds such as alloxy ethoxy dichlorosilane, dialloxydichlorosilane, alloxytrimethoxysilane, dimethalloxydichlorosilane, alloxytriethoxysilane, ethoxytrialloxysilane, dicrotonoxydimethoxysilane, tetraalloxysilane, cetoxytrialloxysilane; aryloxy and aryl alkoxy derivatives such as methyl phenyl diethoxysilane, diphenoxy dichlorosilane, cyclohexyl phenyl dihydroxysilane, phenyl tri-B-chloroethoxysilane, bromophenyltriethoxysilane, tetraphenoxysilane, triphenoxychlorosilane; and siloxane derivatives such as octaethoxytrisiloxane, hexabutoxydisiloxane, hexaethoxydisiloxane, etc. Mixtures of any of the alkoxy or aryloxy or similar compounds with each other, or with one or more acyloxy groups may be used. Mixtures of acyloxy compounds may be used. Mixtures of any of these oxygen derivatives with halogen-hydrolyzed halosilanes may be utilized. Where the compounds employed may require elevated temperatures to melt or foam them, they may be dissolved in lower silane derivatives and subjected to foaming. These oxygen containing derivatives may be hydrolyzed before foaming particularly where halogen is present and halogen only hydrolyzed products produced for foaming.

The organo-silicon derivative employed should be one which is resin-forming and desirably should pass through a viscous liquid stage in which stage the material may be heated to cause it to froth so that the froth may be cured to produce a solid foam. The temperatures of the heat treatment of the organo-silicon derivatives to produce the foam will necessarily vary with the type of material and compositions and mixtures undergoing treatment. Ordinarily the temperature will be at least 100° C. which may be suitable for some of the methyl silicones of low methyl-to-silicon ratio, but generally the lower limit of temperature employed will be about 200 to 250° C., while the upper temperature range will run up substantially to the order of about 500 to 550° C., again depending on the nature of the products undergoing treatment and the conditions under which the treatment is carried out. Some materials like n-butyl-triacetoxy-silane may not foam appreciably at temperatures of the order of 360° C. but will produce very satisfactory foams at temperatures of 400° C. So that the range of temperatures employed necessarily depends on the nature of the material undergoing treatment. Ordinarily the temperature which is used for such foaming and curing operation will be at least 40 to 50° above the temperatures ordinarily utilized for producing curing of the organo-silicon derivative as a film in the production of surface coatings. In many cases the temperatures will be 100 to 200° C. above such curing temperatures and such higher temperatures may be utilized to give the necessary heating to produce the foaming and curing operation. The length of time treatment necessary for producing such foaming and curing again depends on the nature of the materials undergoing treatment and the temperatures at which the operations are carried out and will be determined by the product being sought. Foaming and curing need not be carried out in a single operation but the heat treatment to produce foaming may be carried out followed by a heat treatment to produce curing either at the same or a different temperature from that at which the foaming has been carried out.

Various modifications of the methods of producing foams as set forth above, may be used. For example, gases or vapors may be bubbled through the resins while in liquid condition at the foaming stage just before curing. Gases inert to the resin, such as nitrogen, are preferred unless some special effect is to be sought due to action of the gaseous or vaporous material. Another expedient that may be used is to add to the resins, before the curing stage, compounds which liberate gases at the temperatures used, to assist foaming. Conventional foaming agents that may be added as secondary since not essential therein, include substances which decompose to form gases such as the bicarbonates including alkali metal and ammonium bicarbonates and the related carbamates; substances which volatilize such as water, volatile organic solvents like alcohol, etc.; substances like sugar, naphthalene, or cork which may be later removed by dissolution or volatilization; etc. Further, sub- or super-atmospheric pressures may be utilized in some cases. For example, heating a silicone of the character set forth above, under pressure to just before curing and then releasing the pressure or applying vacuum or suction will cause the resin to yield a very porous solid foam of low density. Any combination of these techniques may be employed. They are not necessary since, as explained hereinabove, the simple heat treatment will produce foamed silicones, but they may be employed for special effects. The proportions of compounds used are not critical. The only requirement is that in the silicone itself, before the curing stage, the ratio of hydrocarbon group such as alkyl to silicon be from 0.5 to 2, the limits of curing silicon resins. For example, in Example 14, the ratio is about 1.3 to 1. The types of starting materials are not critical either as long as they can be made to form silicone resins, by any technique, with the desired hydrocarbon-radical-to-silicon ratios for curing resins. Non-reacting silicon compounds such as the tetra-alkyl silanes may be present as plasticizers, lubricants, etc.; but since they do not enter into the silicone resin structure, they do not affect the ratio.

The foams produced in accordance with the present invention exhibit good moisture, heat, and chemical resistance, low electrical conductivity and many other desirable electrical properties. Their utilization depends on the particular types of materials that it has been sought to produce and as indicated above resilient rubbery products may be produced suitable for use as fillers, packing, shock absorbers, and the like, whereas, hard inflexible foams may be produced particularly adapted for insulation purposes, as for example, heat insulation, sound insulation, electrical insulation, etc., or such hard inflexible foams may be used as supports, etc. Foams of the present invention may be used in buoyancy apparatus such as floats, rafts, buoys, and so forth. The solid silicon foams may be fabricated into various shapes either by forming them in molds, or by cutting machining, grinding, or other operations on the block form of material.

The following examples will illustrate the invention parts being by weight unless otherwise indicated. In these examples, butyltriacetoxysilane, tetra-kis-(B chlor propoxy) silane, tetra-acetoxysilane, and ethylsilicate will be used to exemplify the invention it being understood that other acyloxy compounds as given above may be substituted in these examples for the stated acetoxy derivatives, and similarly other alkoxy, aroxy, cycloalkoxy, etc. derivatives as given above, may be substituted for the alkoxy derivatives in these examples.

*Example 1.*—A mixture of 0.78 g. (0.005 mole) diethyldichlorosilane and 2.88 g. (0.015 mole) n-butyltrichlorosilane was dissolved in 25 cc. ether and hydrolyzed by dropping on cracked ice. The ether layer was placed in a small beaker fitted with a stirrer and warmed to evaporate off the ether. The residue of mixed silicols was then heated with stirring at 195° C. for 1½ hours to condense the material to a viscous liquid. To the cooled viscous liquid was stirred in first 2 g. (0.01 mole) ethyl orthosilicate and then 1 drop concentrated hydrochloric acid. Reheating at 195° C. for 20 minutes caused frothing of the material and curing of the froth into a stable solid foamed silicone resin.

*Example 2.*—About 5 g. of n-butyl trichlorosilane was dissolved in 50 cc. anhydrous ether and hydrolyzed by pouring on cracked ice. The ether layer of silicol was separated, dried over anhydrous sodium sulfate and placed in a large Pyrex test tube. The ether was evaporated off with gentle heat to leave a residue of the fluid silicol. This was then heated 15 minutes at 250° C. to bring about intermolecular condensation to a viscous resin with the elimination of water. Further heating for 30 minutes at 360° C. caused a vigorous frothing and subsequent curing to a light, colorless, porous, resilient foam, more than five times as large in volume as the original liquid.

*Example 3.*—About 5 g. of hydrolyzed phenyldichlorosilane was placed in a large Pyrex test tube and heated five minutes at 360° C. (by immersion in a hot salt bath). The liquid was converted completely to a foam. Curing 15 minutes more at 360° C. gave a colorless highly porous tough mass.

*Example 4.*—Two parts each of halogen-hydrolyzed phenyldichlorosilane and halogen-hydrolyzed diphenylchlorosilane were mixed together and heated at 245–250° C. for 4½ hours while air was slowly bubbled through. The viscous liquid obtained was then heated 2 minutes at 370° C. to convert it to a large mass of froth which after one more hour at 370° C. cured and set to a bulky clear, light-yellow strong solid foam.

*Example 5.*—Five grams of the halogen-cohydrolysis product of two moles of dimethyl chlorosilane and one mole of n-butyltrichlorosilane was placed in a large Pyrex test tube. Through a capillary tube, a fine stream of air bubbles was led through the mixture while it was being heated at 160° C. for 3 hours and then 190° C. for 2 hours. The material was near its gelation point. It was then foamed and cured at 370° C. for 10 minutes to yield a porous spongy, rubbery, colorless mass of less than one-tenth the density of the original liquid.

*Example 6.*—A sample of halogen-hydrolyzed n-butyldichlorosilane was heated for 1 hour at 370° C. The material, still liquid, was cooled to room temperature and 25% of its volume of ethyl orthosilicate was added. The mixture was then heated at 370° C. for 1½ hours to give a dark porous sticky silicone sponge.

*Example 7.*—Purified nitrogen gas was rapidly bubbled through a sample of n-butyltriacetoxysilane being heated at 440° C. The gas bubbles stirred the material and maintained an atmosphere of nitrogen above it. Acetic anhydride distilled off during the first few minutes as the compound condensed. Treatment for 15 minutes more at this temperature yielded a soft porous spongy product having little odor.

*Example 8.*—A sample of halogen-hydrogen-hydrolyzed benzyldichlorosilane was heated at 440° C. while a stream of purified nitrogen gas was bubbled in. After 45 minutes, there was obtained a hard, brittle, solid foam.

*Example 9.*—Repeating Example 8, but without employing the nitrogen gas, a foamed silicone was obtained in 15 minutes at 440° C.

*Example 10.*—A solution was made of two volumes of n-butyl triacetoxysilane to one volume of tetrakis (beta chloropropoxy) silane. It was heated under reflux for 20 minutes at 420° C. During the initial heating, the material refluxed vigorously and slowly thickened. It then frothed completely and cured to a hard brittle foam.

Having thus set forth our invention, we claim:

1. The method of producing an organo silicon oxide froth which comprises frothing by heating in liquid condition at a froth producing temperature a self-frothing silane having at least two —O(CO)$_x$R groups attached through the —O oxygen of the radical directly to silicon where R is a monovalent hydrocrabon radical and $x$ is from 0 to 1, capable of frothing in the absence of any added frothing agent while in the liquid state at elevated temperature of from about 250° C. to 550° C. and capabale of curing by heat, and curing the liquid froth the self-frothing silane being selected from the group consisting of n-butyl-triacetoxy silane, a mixture of n-butyl-triacetoxy silane and tetrakis (beta chloropropoxy) silane, methyl di-beta-chloroethoxy silane, dimethyl diethoxy silane, and methyl triacetoxy silane.

2. The method of claim 1 in which the temperature is at least 400° C., and the silane is n-butyltriacetoxy silane.

3. The method of claim 1 in which the temperature is at least 420° C. and the silane includes a mixture of n-butyl-triacetoxy silane and tetrakis (beta chloropropoxy) silane.

4. The method of claim 1 in which the silane is methyl di-B-chloroethoxy silane and the temperature is selected from between about 250° C. to about 550° C.

5. The method of claim 1 in which the silane is dimethyl diethoxy silane and the temperature is selected from between about 250° C. to about 550° C.

6. The method of claim 1 in which the silane is methyltriacetoxy silane and the temperature is selected from between about 250° C. to about 550° C.

References Cited in the file of this patent

UNITED STATES PATENTS

| | | |
|---|---|---|
| 2,460,795 | Warrick | Feb. 1, 1949 |
| 2,506,616 | Rust et al. | May 9, 1950 |
| 2,507,422 | Rust et al. | May 9, 1950 |

OTHER REFERENCES

Webster's New International Dictionary, 2nd edition, Merriam-Webster, pages XVIII, 67, 1548.